United States Patent [19]
Hashiguchi et al.

[11] Patent Number: 5,245,866
[45] Date of Patent: Sep. 21, 1993

[54] DEVICE FOR DETECTING OCCURRENCE OF MISFIRING IN MULTICYLINDER ENGINE

[75] Inventors: Yukihide Hashiguchi; Nobuyuki Kobayashi, both of Toyota, Japan

[73] Assignee: Toyota Jidosha Kabushiki Kaisha, Toyota, Japan

[21] Appl. No.: 934,829

[22] Filed: Aug. 24, 1992

[30] Foreign Application Priority Data

Aug. 29, 1991 [JP] Japan .................................. 3-218794

[51] Int. Cl.⁵ .......................................... G01M 15/00
[52] U.S. Cl. ................... 73/117.3; 364/431.07
[58] Field of Search ............... 73/116, 117.3; 123/419; 364/431.07

[56] References Cited
U.S. PATENT DOCUMENTS
5,132,909 7/1992 Schroeder et al. ............... 73/116 X Primary Examiner—Jerry W. Myracle
Attorney, Agent, or Firm—Kenyon & Kenyon

[57] ABSTRACT

A device for detecting an occurrence of misfiring comprising a crankshaft sensor, which crankshaft sensor is used to detect the elapsed time required for the crankshaft to turn by a predetermined crankshaft angle during combustion in the cylinders. The difference in the elapsed time between cylinders where every other power stroke is performed is found and a determination is made as to at which cylinder the misfiring occurred when the difference exceeds a set value. The difference in elapsed times between cylinders with power strokes of crank angles 360° apart is found and an estimated value of the difference changing due to acceleration or deceleration is found from that difference. This estimated value is used to correct the set value.

17 Claims, 14 Drawing Sheets

DEVICE FOR DETECTING OCCURRENCE OF MISFIRING IN MULTICYLINDER ENGINE

BACKGROUND OF THE INVENTION

1. Field of the Invention

The present invention relates to a device for detecting an occurrence of misfiring in a multicylinder engine.

2. Description of the Related Art

When one of the cylinders in a multicylinder engine misfires, the engine rotational speed drops at the power stroke of the misfiring period and therefore the time required for the crankshaft to turn by a certain crank angle during the power stroke of the misfiring cylinder becomes longer than that of other cylinders.

Therefore, for example, there is known a multicylinder engine where it is determined, for example, that the no. 1 cylinder has misfired when the period required for the crankshaft to turn by a certain crank angle in the power stroke of the no. 1 cylinder becomes longer than that of other cylinders (see Japanese Unexamined Patent Publication (Kokai) No. 62-228929).

However, when a vehicle is decelerating, the time required for the crankshaft to turn by a predetermined crank angle continues to increase, so the time required for the crankshaft to turn by a predetermined angle at a certain cylinder will become longer than that required a other cylinders. If misfiring is determined from when the time required for the crankshaft to turn by a predetermined crank angle in the internal combustion engine becomes longer than that at other cylinders, then it will be erroneously determined that a misfiring has occurred despite no such misfiring having happened. Further, when a vehicle runs over a bumpy road, the ground contact pressure of the drive wheels with the road surface changes. When the ground contact pressure falls, the drive wheels slip and the engine rotational speed rises. Next, when the ground contact pressure rises and the drive wheels grip the road surface, the engine rotational speed falls. At this time, the time required for the crankshaft to turn by a predetermined crank angle at a certain cylinder will become longer, for a while, than that at other cylinders, therefore an erroneous determination will be made that a misfiring has occurred despite no such misfiring having happened.

SUMMARY OF THE INVENTION

The object of the present invention is to provide a device capable of correctly detecting an occurrence of misfiring.

According to the present invention, there is provided a device for detecting an occurrence of misfiring in a multicylinder engine having a crankshaft, the device comprising angular velocity detecting means for detecting angular velocities of the crankshaft in a time when combustion is carried out in each cylinder; difference calculating means for calculating a difference in the angular velocities of the crankshaft between the cylinders; comparing means for comparing the difference and a predetermined value; estimating means for estimating a change in the difference which is caused by acceleration and deceleration of the engine and occurs when the comparison by the comparing means is carried out; correcting means for correcting at least one of the difference and the predetermined value on the basis of the change in the difference before the comparison by the comparing means is carried out; and determining means for determining whether or not a misfiring occurs after the correction by the correcting means is carried out to determine that a misfiring occurs when it is determined that the difference exceeds the predetermined value by the comparing means.

BRIEF DESCRIPTION OF THE DRAWINGS

The present invention may be more fully understood from the description of the preferred embodiments of the invention set forth below, together with the accompanying drawings, in which.

DESCRIPTION OF THE PREFERRED EMBODIMENTS

Figure 1:
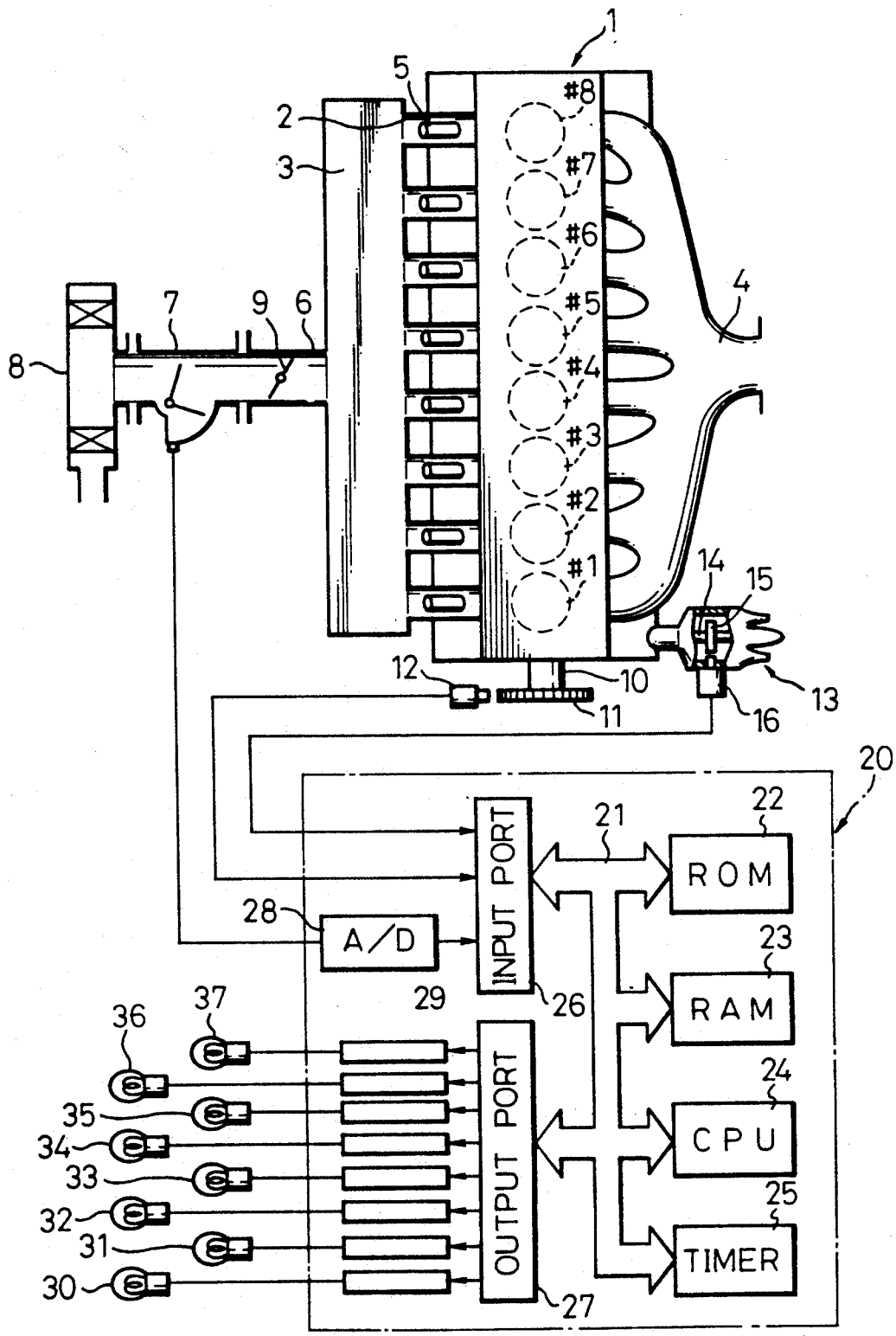
FIG. 1 is an overall view of an internal combustion engine.

FIG. 1 shows the case of application of the present invention to an eight-cylinder internal combustion engine.

Referring to FIG. 1, the internal combustion engine 1 is provided with eight cylinders: a no. 1 cylinder #1, a no. 2 cylinder #2, a no. 3 cylinder #3, a no. 4 cylinder #4, a no. 5 cylinder #5, a no. 6 cylinder #6, a no. 7 cylinder #7, and a no. 8 cylinder #8. The cylinders are connected on the one hand to a surge tank 3 through corresponding branching pipes 2 and are connected on the other hand to an exhaust manifold 4. In the branching pipes 2 are mounted fuel injectors 5. The surge tank 3 is connected to an air cleaner 8 through an intake duct 6 and an air flow meter 7. Inside the intake duct 6 there is provided a throttle valve 9. On the other hand, a disk-shaped rotor 11 is attached to a crankshaft 10 of the internal combustion engine 1, a crank angle sensor 12 being disposed facing the outer circumference of the rotor 11. On the body of the internal combustion engine 1, further, is attached a distributor 13, which distributor 13 is provided with a shaft 14 which rotates at a speed of ½ that of the crankshaft 10. The shaft 14 has fixed to it a disk-shaped rotor 15. A top dead center sensor 16 is arranged facing the outer circumference of the rotor 15. The crank angle sensor 12 and the top dead center sensor 16 are connected to an electronic control unit 20.

The electronic control unit 20 is comprised of a digital computer, which in turn is provided with a ROM (read only memory) 22, a RAM (random access memory) 23, a CPU (microprocessor etc.) 24, a timer 25, an input port 26, and an output port 27, connected to each other via a bidirectional bus 21. The timer 25 is comprised of a free running counter which continues a counting operation when power is supplied to the electronic control unit 20 and therefore the count of the free running counter indicates the time. The air flow meter 7 is generates an output voltage proportional to the amount of intake air, which output voltage is input to the input port 26 through an AD converter 28. Further, the output signals of the crank angle sensor 12 and the top dead center sensor 16 are input to the input port 26. On the other hand, the output port 27 is connected through a corresponding drive circuit 29 to an alarm lamp 30 which indicates that the no. 1 cylinder #1 has misfired, an alarm lamp 31 which indicates that the no. 2 cylinder #2 has misfired, an alarm lamp 32 which indicates that the no. 3 cylinder #3 has misfired, an alarm lamp 33 which indicates that the no. 4 cylinder #4 has misfired, an alarm lamp 34 which indicates that the no. 5 cylinder #5 has misfired, an alarm lamp 35 which indicates that the no. 6 cylinder #6 has misfired, an alarm lamp 36 which indicates that the no. 7 cylinder #7 has misfired, and an alarm lamp 37 which indicates that the no. 8 cylinder #8 has misfired.

Figure 2:
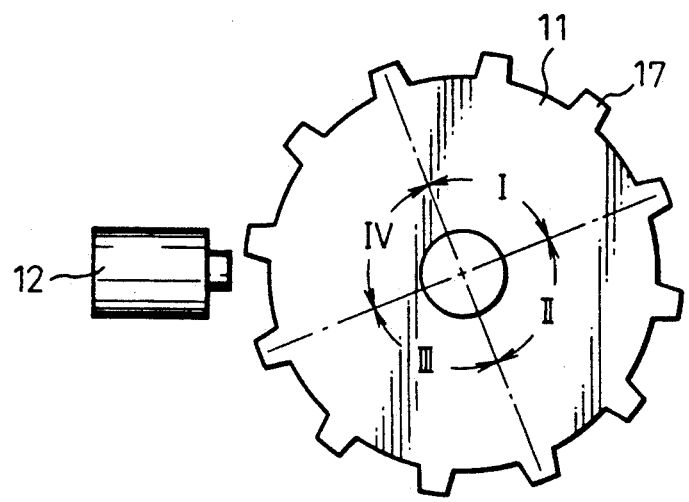
FIG. 2 is a frontal view of a rotor.

FIG. 2 shows the rotor 11 and the crank angle sensor 12. In the embodiment shown in FIG. 2, the rotor 11 has 12 outer teeth 17 which are formed at equiangular distances of 30°. The crank angle sensor 12 is comprised of an electromagnetic pickup which generates an output pulse when facing a tooth 17. Therefore, in the embodiment shown in FIG. 2, when the crankshaft 10 (FIG. 1) rotates, that is, when the rotor 11 rotates, the crank angle sensor 12 generates an output pulse each time the crankshaft 10 rotates 30°, which output pulse is input to the input port 26 (FIG. 1).

Figure 3:
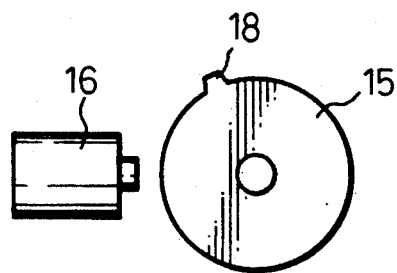
FIG. 3 is another frontal view of a rotor.

On the other hand, FIG. 3 shows the rotor 15 and the top dead center sensor 16. In the embodiment shown in FIG. 3, the rotor 15 has a single projection 18. The top dead center sensor 16 is comprised of an electromagnetic pickup which generates an output pulse when facing the projection 18. As mentioned earlier, the rotor 15 is rotated at a rotational speed of ½ that of the crankshaft 10 (FIG. 1). Therefore, when the crankshaft 10 rotates, the top dead center sensor 16 generates an output pulse every 20° rotation of the crankshaft 10, which output pulse is input to the input port 26 (FIG. 1). The projection 18 is positioned as to face the top dead center sensor 16 when, for example, the no. 1 cylinder #1 reaches the top dead center of the power stroke. Therefore, when the no. 1 cylinder #1 reaches the top dead center of the power stroke, the top dead center sensor 16 generates an output pulse. In the CPU 24, the current crank angle is calculated based on the output pulse and the crank angle sensor 12 of the top dead center 16. Further, the engine rotational speed is calculated based on the output pulse of the crank angle sensor 12.

If a misfire occurs in any one of the cylinders and the engine rotational speed drops, the elapsed time required for the crankshaft to rotate by a predetermined crank angle becomes longer. Therefore, in the embodiment of the present invention, the elapsed times required for the crankshaft to rotate by a predetermined crank angle during the combustion in the cylinders are detected and a determination made on if misfiring has occurred based on the elapsed times. Note that the elapsed time becomes longer when misfiring occurs and the engine rotational speed N falls. On the other hand, the angular velocity of the crankshaft 10 is proportional to the engine rotational speed N, so the average velocity of the crankshaft 10 is inversely proportional to the elapsed time.

Figure 4:
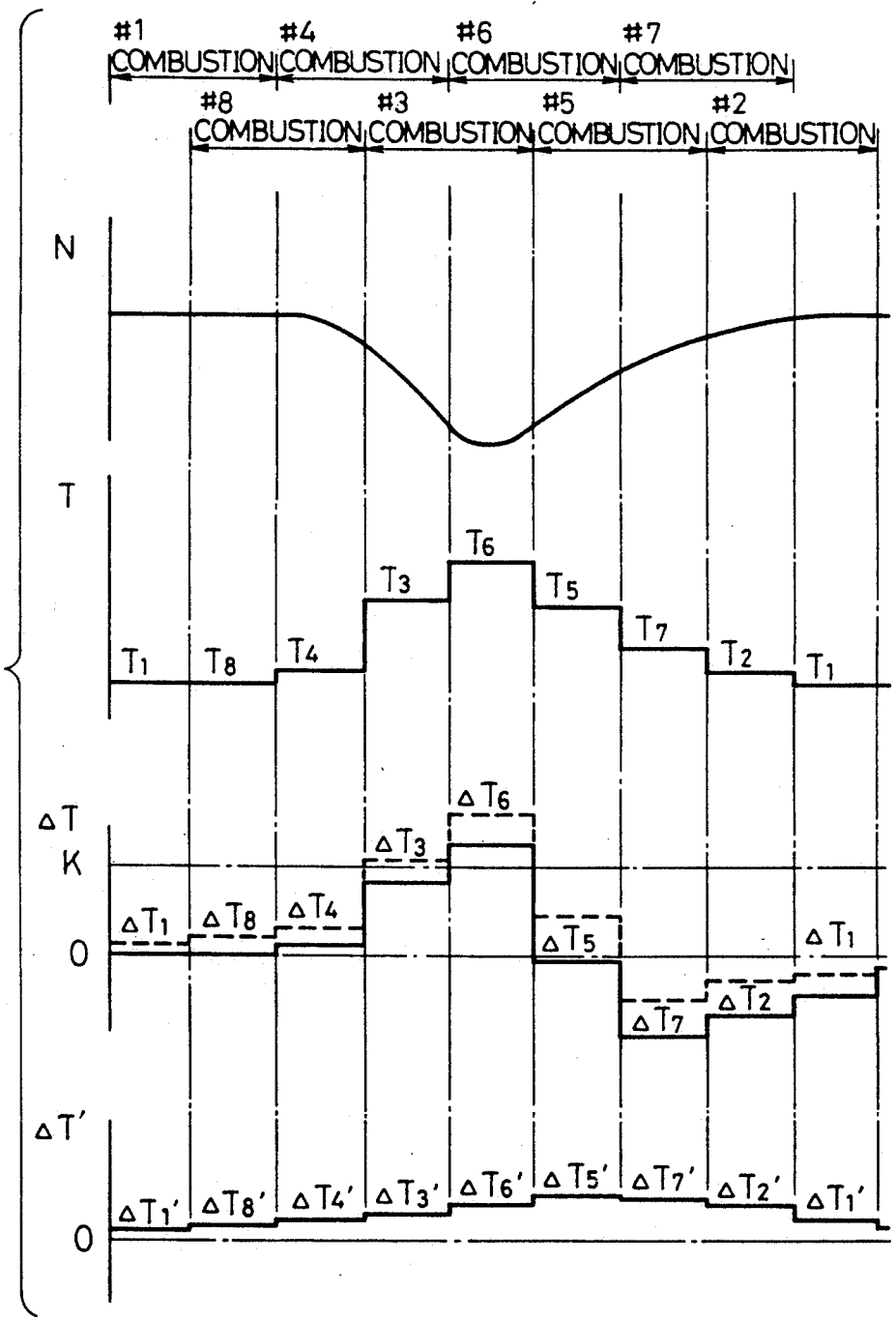
FIG. 4 is a time chart showing the changes in the time elapsed etc. in the first half of a combustion stroke during misfiring.
Figure 6:
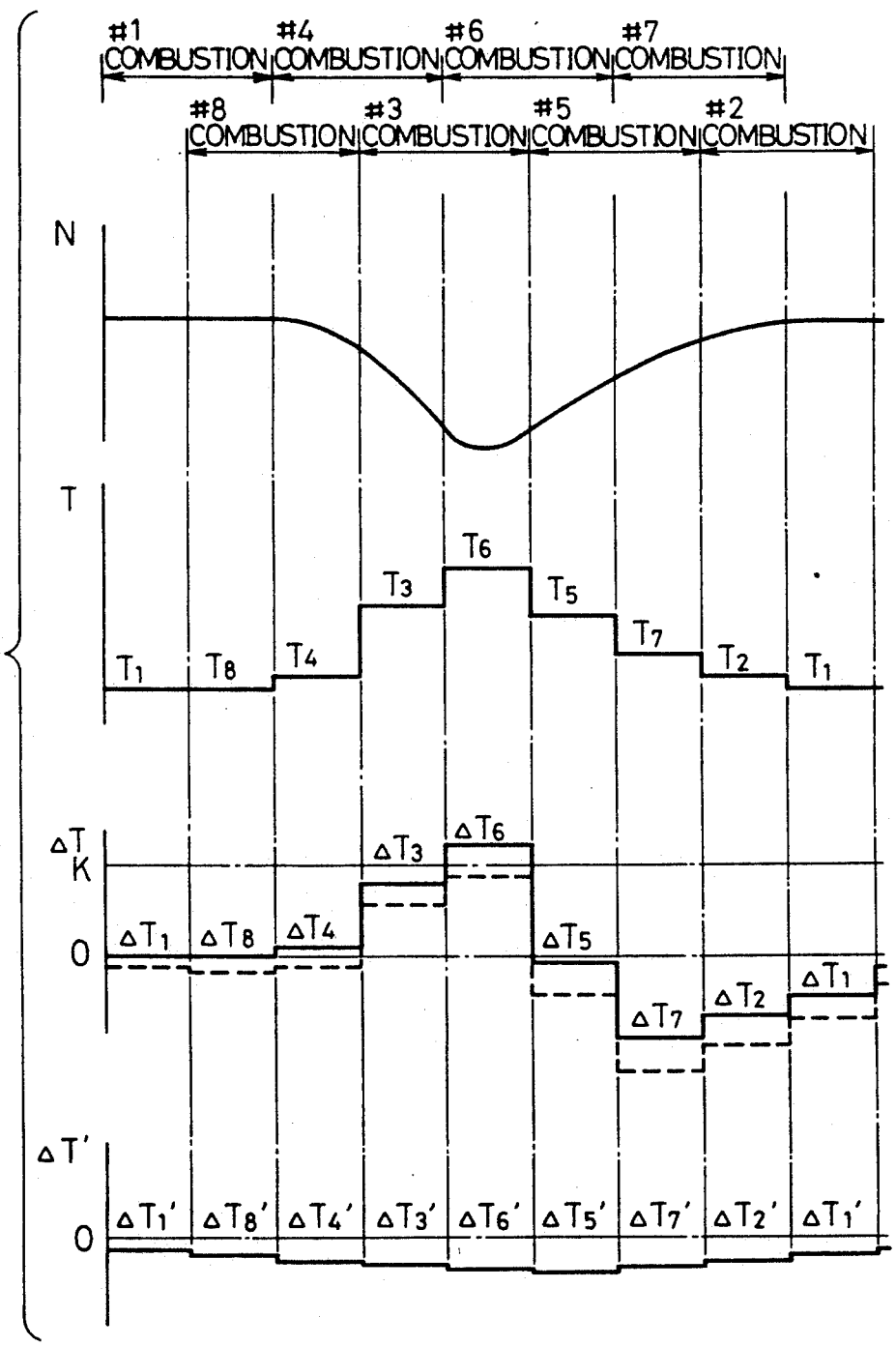
FIG. 6 is a time chart showing the changes in the time elapsed etc. in the first half of a combustion stroke during misfiring.

Next, referring to FIG. 4 and FIG. 6, an explanation will be made of the method for detecting misfiring using the elapsed times. Note that FIG. 4 and FIG. 6 show the example of an eight cylinder internal combustion engine with a firing sequence of 1-8-4-3-6-5-7-2. Further, FIG. 4 and FIG. 6 show the case of occurrence of misfiring in the no. 4 cylinder #4. N shows the change in the engine rotational speed at that time. Further, $T_1$ shows the elapsed time required for the crankshaft 10 to rotate by 90° crank angle in the first half of the period of combustion in the no. 1 cylinder #1. Similarly, $T_8$ shows the elapsed time in the first half of the combustion stroke of the no. 8 cylinder #8, $T_4$ shows the elapsed time in the first half of the combustion stroke of the no. 4 cylinder #4, $T_3$ shows the elapsed time in the first half of the combustion stroke of the no. 3 cylinder #3, $T_6$ shows the elapsed time in the first half of the combustion stroke of the no. 6 cylinder #6, $T_5$ shows the elapsed time in the first half of the combustion stroke of the no. 5 cylinder #5, $T_7$ shows the elapsed time in the first half of the combustion stroke of the no. 7 cylinder #7, and $T_2$ shows the elapsed time in the first half of the combustion stroke of the no. 2 cylinder #2.

As shown in FIG. 4 and FIG. 6, if misfiring occurs in the no. 4 cylinder #4 the engine rotational speed N begins to fall. Even if a misfiring occurs in the no. 4 cylinder #4 and the engine rotational speed N falls, if combustion proceeds normally in the next no. 3 cylinder #3 and the following cylinders, it would seem that the engine rotational speed N would immediately rise. However, in actuality, as shown in FIG. 4 and FIG. 6, after misfiring occurs in the no. 4 cylinder #4, the engine rotational speed N continues to fall while the crankshaft 10 is rotating about 180° in crank angle and then finally the engine rotational speed starts to rise again. That is, the engine rotational speed N is maintained constant by the combustion pressure in the power strokes. When misfiring occurs in the no. 4 cylinder #4, the drive force given to the engine falls during the power stroke of the no. 4 cylinder #4, that is, over substantially 180° crank angle, so during the period when the drive force given to the engine declines, that is, during the period when the crankshaft 10 rotates by about 180° crank angle, the engine rotational speed N will continue to fall. Therefore, when a misfiring occurs at the no. 4 cylinder #4, the engine rotational speed N will fall the most in the first half of the combustion stroke of the no. 6 cylinder #6 180° crank angle after that time.

Therefore, assuming that the misfiring occurs at the no. 4 cylinder #4, then the elapsed time $T_4$ in the first half of the combustion stroke of the no. 4 cylinder #4 increases somewhat, the elapsed time $T_3$ in the first half of the combustion stroke of the following no. 3 cylinder #3 increases widely, and the elapsed time $T_6$ in the first half of the combustion stroke of the following no. 6 cylinder #6 increases even further, then the elapsed times gradually decrease.

On the other hand, in FIG. 4 and FIG. 6, $\Delta T$ shows the difference in the elapsed times in the first half of every other combustion stroke. For example, looking at the no 4 cylinder #4, $\Delta T_4$ shows $(T_4 - T_1)$, that is, the difference in the elapsed times $T_4$ and $T_1$ in the first halves of the combustion strokes of the no. 4 cylinder

4 and the no. 1 cylinder #1. Therefore, this difference ΔT shows the difference of the angular velocities of the crankshaft 10 between the first halves of combustion strokes one stroke apart. As shown by the solid lines in FIG. 4 and FIG. 6, if misfiring occurs in the no. 4 cylinder #4, the elapsed time $T_4$ in the first half of the combustion stroke of the no. 4 cylinder #4 becomes slightly longer than the elapsed time $T_1$ of the first half of the combustion stroke of the no. 1 cylinder #1, so the difference $\Delta T_4$ slightly increases. As opposed to this, the elapsed time $T_3$ in the first half of the combustion stroke of the no. 3 cylinder #3 increases widely over the elapsed time $T_8$ of the first half of the no. 8 cylinder #8, so the difference $\Delta T_3$ increases widely. On the other hand, the elapsed time $T_6$ of the first half of the combustion stroke of the no. 6 cylinder #6 increases further compared with the elapse time $T_4$ of the first half of the combustion stroke of the no. 4 cylinder #4, so the difference $\Delta T_6$ becomes even larger.

After this, the elapsed times decrease, so the differences ΔT become smaller. Therefore, ΔT becomes the largest, $\Delta T_6$, corresponding to the first half of the combustion stroke of the no. 6 cylinder #6 and it becomes possible to discriminate that misfiring has occurred at the cylinder two strokes before, that is, in the no. 4 cylinder #4, by discriminating that the difference ΔT has exceeded the set value K shown in FIG. 4 and FIG. 6.

If, however, for example, deceleration is started and the engine rotational speed N is decreased in an accelerated fashion, the difference in the elapsed times in the first half of combustion strokes one stroke apart increases. In FIG. 4, ΔT' shows this difference. For example, looking at the no. 4 cylinder #4, $\Delta T'_4$ expresses $(T_4-T_1)$. Therefore, when the engine rotational speed N is made to decrease in an accelerated fashion, if misfiring occurs, ΔT increases by exactly ΔT' and becomes as shown by the broken line in FIG. 4, therefore $\Delta T_3$ ends up exceeding the set value K. If $\Delta T_3$ exceeds the set value K, it is determined that misfiring occurred even in the no. 8 cylinder #8, so it means an erroneous determination is made. To avoid such an erroneous determination, it will be understood that it is sufficient to subtract ΔT' from ΔT or to make the set value K higher by exactly ΔT'.

On the other hand, for example, if acceleration is started and the engine rotational speed N is increased in an accelerated fashion, the difference in the elapsed times in the first half of combustion strokes one stroke apart decreases. In FIG. 6, ΔT' shows this difference. For example, looking at the no. 4 cylinder #4, $\Delta T'_4$ expresses $(T_4-T_1)$. Therefore, when the engine rotational speed N is made to increase in an accelerated fashion, if misfiring occurs, ΔT decreases by exactly ΔT' and becomes as shown by the broken line in FIG. 6, therefore $\Delta T_6$ ends up becoming smaller than even the set value K. If $\Delta T_6$ becomes smaller than the set value K, it is determined that no misfiring occurred in the no. 4 cylinder #4, so it means an erroneous determination is made. To avoid such an erroneous determination, it will be understood that it is sufficient to add ΔT' to ΔT or to make the set value K smaller by exactly ΔT'.

The actually detectable difference, however, is the sum of ΔT (that shown by solid line in FIG. 4 and FIG. 6) and ΔT' (that shown by broken line in ΔT in FIG. 4 and FIG. 6). It is not known much of this sum ΔT' accounts for. Therefore, ΔT' must be estimated. As shown in FIG. 4 and FIG. 6, however, if misfiring occurs in the no. 4 cylinder #4, the ΔT of the cylinder before the no. 4 cylinder #4 ($\Delta T_1$ and $\Delta T_8$ in FIG. 4 and FIG. 6) becomes zero in so far as there is no acceleration or deceleration. Therefore, the fact that the ΔT of the cylinder before the no. 4 cylinder #4 is not zero means that acceleration or deceleration has been performed. Therefore, it is possible to estimate how much of the sum of ΔT and ΔT' mentioned above is accounted for by ΔT' from the change of the ΔT in the cylinder before the no. 4 cylinder #4.

Therefore, in the case of misfiring in the no. 4 cylinder #4 in an eight-cylinder internal combustion engine, it becomes possible to estimate ΔT' from the difference ΔT between the no. 8 cylinder #8 and the cylinder where combustion was performed before the no. 8 cylinder #8. In this case, in the first embodiment, the estimated value α of ΔT' is calculated based on the following equation:

$$\Delta t_n = T_{n-3} - T_{n-7}$$

$$\alpha = (\Delta t_n + \Delta t_{n-1} + \Delta t_{n-2} + \Delta t_{n-3})/8$$

Here, n shows the cylinder of the combustion stroke determined to have misfired, therefore in FIG. 4 and FIG. 6 shows the no. 6 cylinder #6. On the other hand, (n-1) shows the cylinder where combustion was performed before the cylinder of the combustion stroke determined to have misfired, and (n-2) shows the cylinder where combustion was performed once more before that. Therefore, (n-3) shows the cylinder where combustion was performed before the no. 4 cylinder #4 where misfiring occurred, that is, shows the no. 8 cylinder #8, while (n-4) shows the no. 1 cylinder #1. The same follows below. Therefore, $\Delta T_n$ $(=T_{n-3}-T_{n-7})$; shows the difference in the elapsed times T in two cylinders where combustion was performed before the misfiring cylinder and separated in combustion strokes by 360° crank angle. If the differences are found for four pairs of cylinders separated by 360° crank angle, the average value of the differences becomes $(\Delta t_n + \Delta t_{n-1} + t_{n-2} + \Delta t_{n-3})/4$. That is, if deceleration or acceleration is performed, the difference ΔT deviates by this average value per 360° crank angle. In the embodiment shown in FIG. 4 and FIG. 6, however, the differences for every 180° crank angle are shown, so in actuality the differences ΔT deviate by half the above and therefore the estimated value α of the ΔT' is expressed as above.

Figure 5:
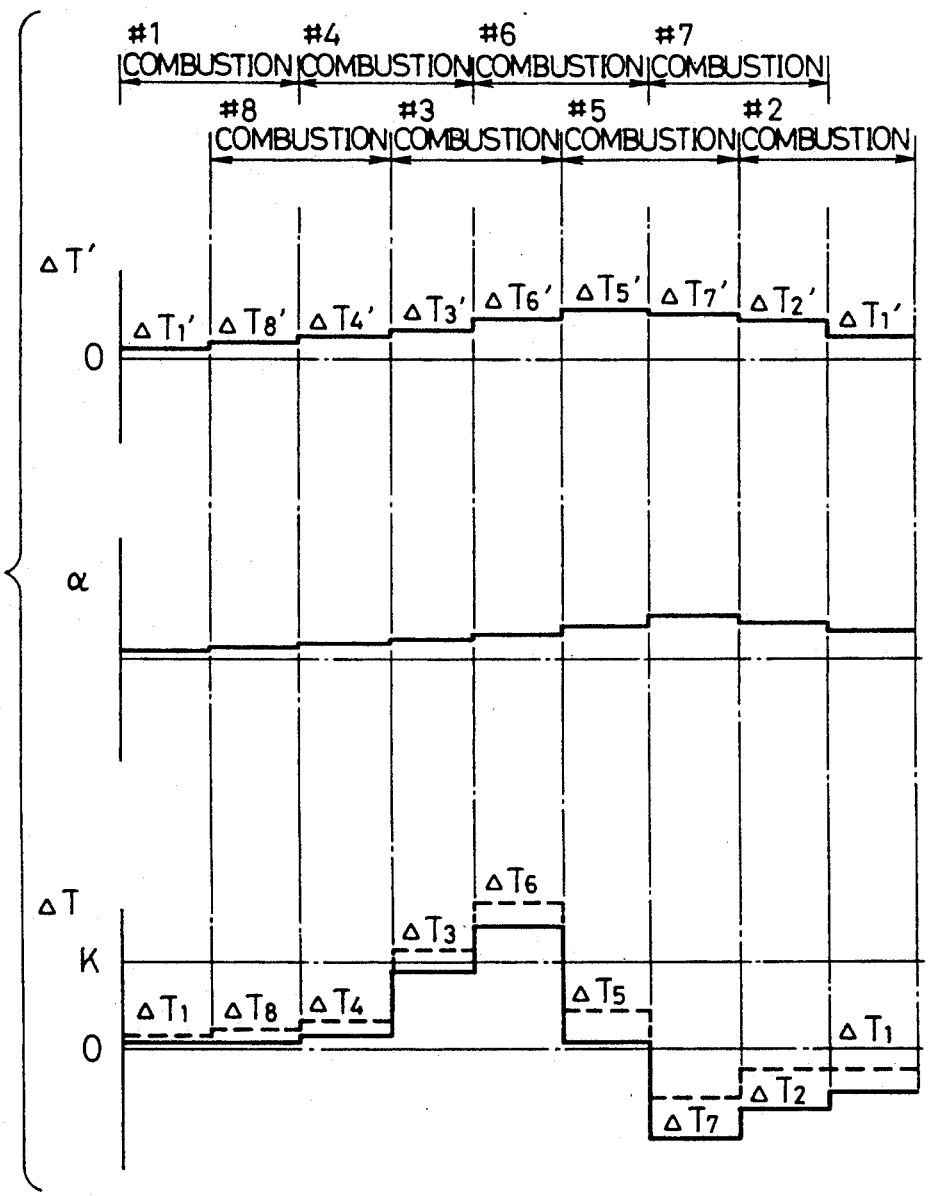
FIG. 5 is a time chart showing the changes etc. in an estimated value $\alpha$.

For example, if deceleration is started and the engine rotational speed N decreases in an accelerated fashion, the elapsed time T increases along with the same, so the $\Delta t_n$ also increases and therefore the estimated value α of ΔT' increases as well. As opposed to this, when acceleration is started and the engine rotational speed N increases in an accelerated fashion, the estimated value α of γT' decreases. Therefore, α expresses well the change of ΔT'. FIG. 5 shows the changes in the estimated value α when the ΔT' changes as shown in FIG. 4. Further, FIG. 5 shows the case of subtraction of the estimated value α from the actually detected difference shown by the broken line.

On the other hand, a second embodiment for finding the estimated value α of the ΔT' is shown below:

$$\Delta t_n = T_{n-3} - T_{n-4}$$

$$\alpha = (\Delta t_n + \Delta t_{n-1} + \Delta t_{n-2} + \Delta t_{n-3})/2$$

In the second embodiment, the difference in the elapsed times T in two cylinders where combustion was performed before the misfiring cylinder and separated in combustion strokes by 90° crank angle is shown. If the differences are found for four pairs of cylinders separated by 90° crank angle, the average value of the differences becomes $(\Delta t_n + \Delta t_{n-1} + t_{n-2} + \Delta t_{n-3})/4$. That is, if deceleration or acceleration is performed, the difference $\Delta T$ deviates by this average value per 90° crank angle. In the embodiment shown in FIG. 4 and FIG. 6, however, the differences for every 180° crank angle are shown, so in actuality the differences $\Delta T$ deviate by twice the above and therefore the estimated value $\alpha$ is expressed as above.

Figure 7:
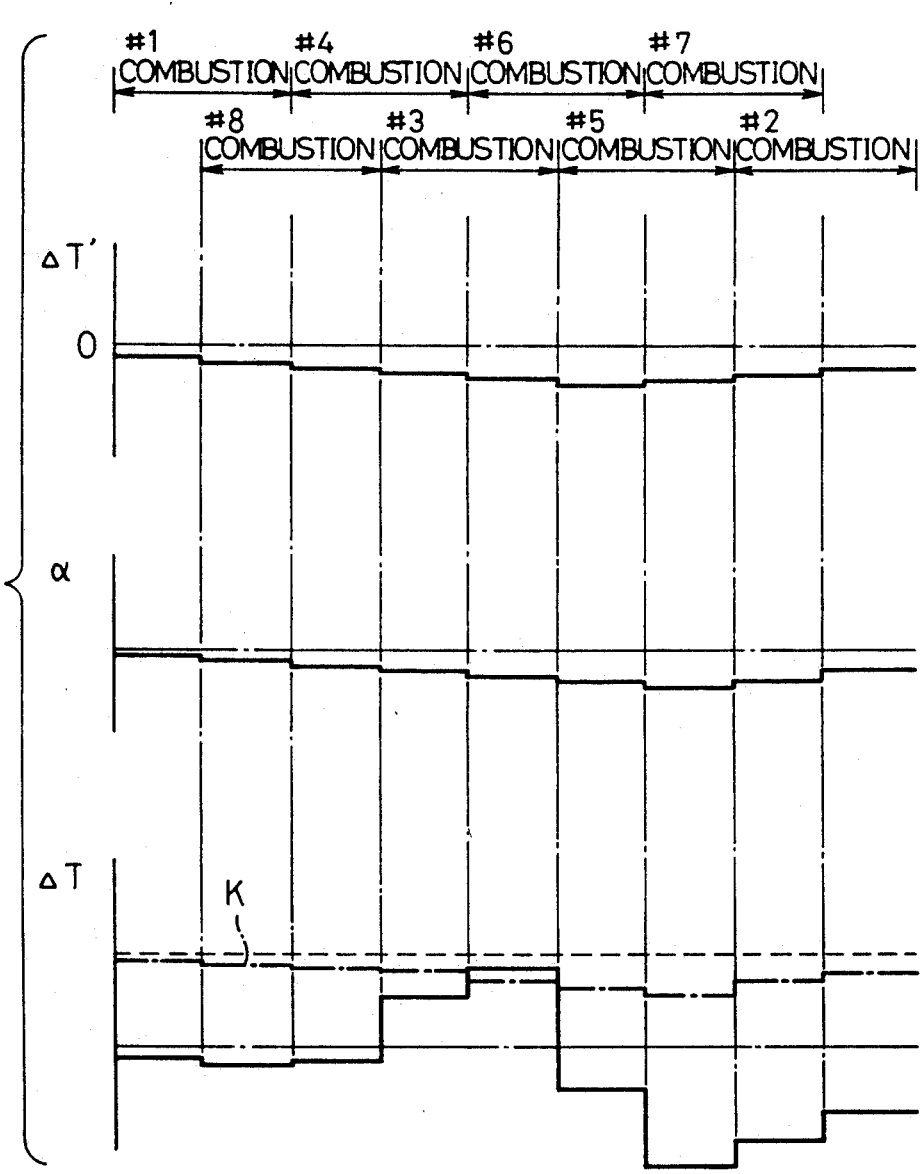
FIG. 7 is a time chart showing the changes etc. in an estimated value $\alpha$.

Even in the second embodiment, for example, if deceleration is started and the engine rotational speed N decreases in an accelerated fashion, the elapsed time T increases along with the same, so the $\Delta t_n$ also increases and therefore the estimated value $\alpha$ of $\Delta T'$ increases as well. As opposed to this, when acceleration is started and the engine rotational speed N increases in an accelerated fashion, the elapsed time T decreases, and therefore $\Delta t_n$ also decreases, so the estimated value $\alpha$ of $\gamma T'$ decreases. Therefore, $\alpha$ expresses well the change of $\Delta T'$. FIG. 7 shows the changes in the estimated value $\alpha$ when the $\Delta T'$ changes as shown in FIG. 6. Further, FIG. 7 shows the case of subtraction of the estimated value $\alpha$ from the set value K shown by the broken line.

As shown in FIG. 5, even if the difference $\Delta T$ is corrected based on the estimated value $\alpha$ or the set value K is corrected based on the estimated value $\alpha$ as shown in FIG. 7, only $\Delta T_6$ comes to exceed the set value K, so it will be understood that it is possible to reliably detect misfiring without being affected by deceleration or acceleration.

Figure 8:
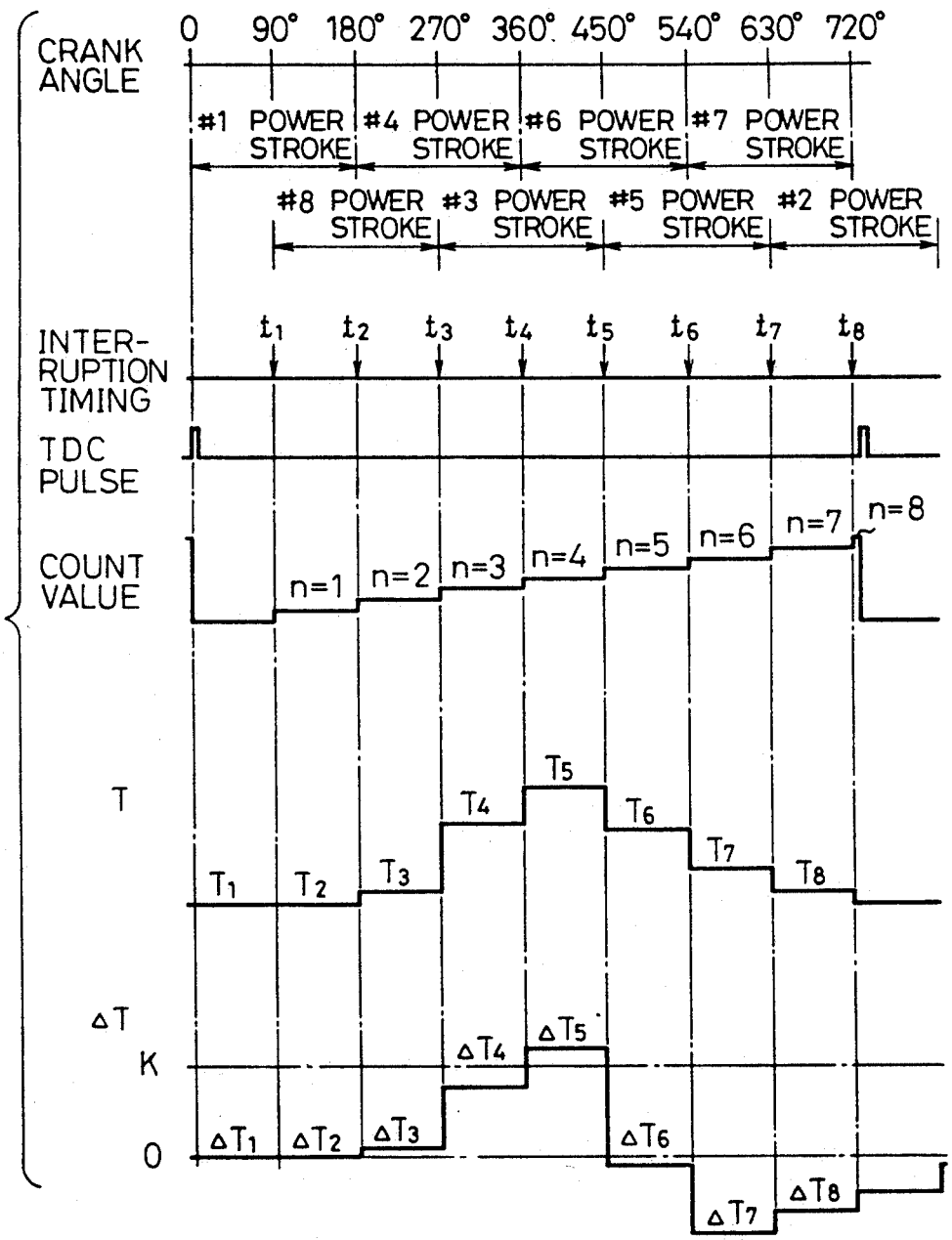
FIG. 8 is a time chart of a specific example using the method of detection of misfiring according to the present invention.

FIG. 8 shows a time chart of a specific example using the method of detection of misfiring shown in FIG. 4 to FIG. 7. Note that in FIG. 8, the crank angle is shown based on the top dead center of the power stroke of the no. 1 cylinder #1.

Figure 9:
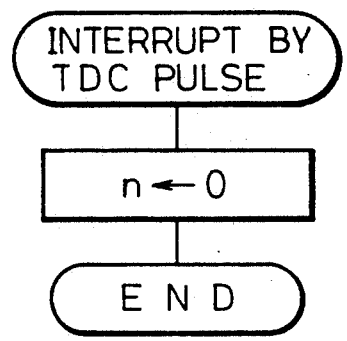
FIG. 9 is a flow chart of a routine executed by interruption.

When the no. 1 cylinder #1 reaches the top dead center of the power stroke the top dead center sensor 16 generates the top dead center pulse as shown in FIG. 8. When this top dead center pulse is generated, the interruption routine shown in FIG. 9 is executed and the count n of the counter is made zero. On the other hand, as shown by $t_1$, $t_2$, $t_3$, $t_4$, $t_5$, $t_6$, $t_7$, and $t_8$ of FIG. 8, the interruption routine is executed every 90° crank angle in the middle of the power strokes of the cylinders. When an interruption routine is executed, the count of the counter is incremented by exactly 1 and simultaneously the elapsed times $T_1$, $T_2$, $T_3$, $T_4$, $T_5$, $T_6$, $T_7$, and $T_8$ from the previous interruption to the current interruption are calculated. That is, at the interruption shown by $t_1$, the elapsed time $T_1$ in the first half of the combustion stroke of the no. 1 cylinder #1 is calculated, at the interruption shown by $t_2$, the elapsed time $T_2$ in the first half of the combustion stroke of the no. 8 cylinder #8 is calculated, at the interruption shown by $t_3$, the elapsed time $T_3$ in the first half of the combustion stroke of the no. 4 cylinder #4 is calculated, at the interruption shown by $t_4$, the elapsed time $T_4$ in the first half of the combustion stroke of the no. 3 cylinder #3 is calculated, at the interruption shown by $t_5$, the elapsed time $T_5$ in the first half of the combustion stroke of the no. 6 cylinder #6 is calculated, at the interruption shown by $t_6$, the elapsed time $T_6$ in the first half of the combustion stroke of the no. 5 cylinder #5 is calculated, at the interruption shown by $t_7$, the elapsed time $T_7$ in the first half of the combustion stroke of the no. 7 cylinder #7 is calculated, and at the interruption shown by $t_8$, the elapsed time $T_8$ in the first half of the combustion stroke of the no. 2 cylinder #2 is calculated.

Further, the difference $\Delta T$ of the elapsed times T in the first halves of combustion strokes two strokes apart is calculated. That is, at the interruption shown by $t_1$, $\Delta T_1 (=T_1-T_7)$ is calculated, at the interruption shown by $t_2$, $\Delta T_2 (=T_2-T_8)$ is calculated, at the interruption shown by $t_3$, $\Delta T_3 (=T_3-T_1)$ is calculated, at the interruption shown by $t_4$, $\Delta T_4 (=T_4-T_2)$ is calculated, at the interruption shown by $t_5$, $\Delta T_5 (=T_5-T_3)$ is calculated, at the interruption shown by $t_6$, $\Delta T_6 (=T_6-T_4)$ is calculated, at the interruption shown by $t_7$, $\Delta T_7 (=T_7-T_5)$ is calculated, and at the interruption shown by $t_8$, $\Delta T_8 (=T_8-T_6)$ is calculated.

Figure 10:
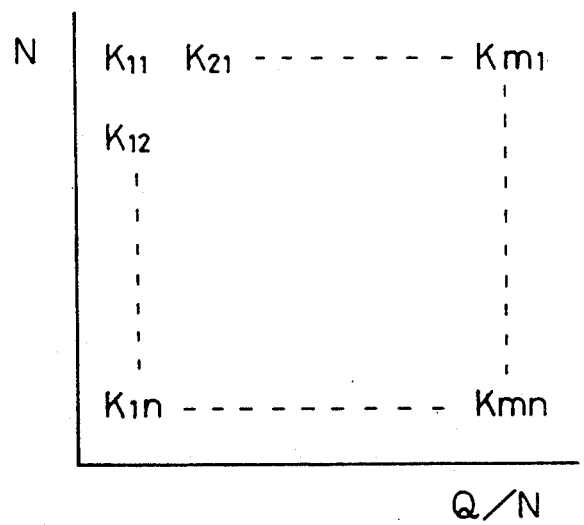
FIG. 10 is a graph of the set value K.

At each interruption, further, it is determined if the difference $\Delta T$ is larger than the set value K. Here, the set value K is a function of the engine rotational speed N and the engine load Q/N (intake air amount Q/engine rotational speed N). The value of K is stored in advance in the ROM 22 in the form of a map as shown in FIG. 10. The value of K becomes smaller the higher the engine rotational speed N, roughly speaking, and becomes larger along with the rise in the engine load Q/N. Note that when correcting the set value K based on the estimated value $\alpha$, the estimated value $\alpha$ is added to the set value K stored in the ROM 22.

When using the rotor 11 and the crank angle sensor 12 as shown in FIG. 2 to find the difference $\Delta t$ from the output pulses of the crank angle sensor 12, if a difference occurs in the intervals between the teeth 17 due to manufacturing error of the rotor 11, the elapsed time T will change due to this and there is a danger of erroneous determination that deceleration or acceleration has been performed even when the engine is running at a constant speed. As in the first embodiment for calculating the estimated value $\alpha$ as mentioned earlier, however, when finding the difference $\Delta t_n$ of the elapsed times T in cylinders 360° apart, the difference $\Delta t_n$ in the cylinders is calculated based on the teeth 17 of the same regions I, II, III, and IV shown in FIG. 2. Therefore, even if there was manufacturing error in the rotor 11, the manufacturing error does not appear at all in the difference $\Delta t_n$ and therefore an erroneous determination that there has been deceleration or acceleration despite the engine being operated at a constant speed can be completely avoided.

Figure 11A:
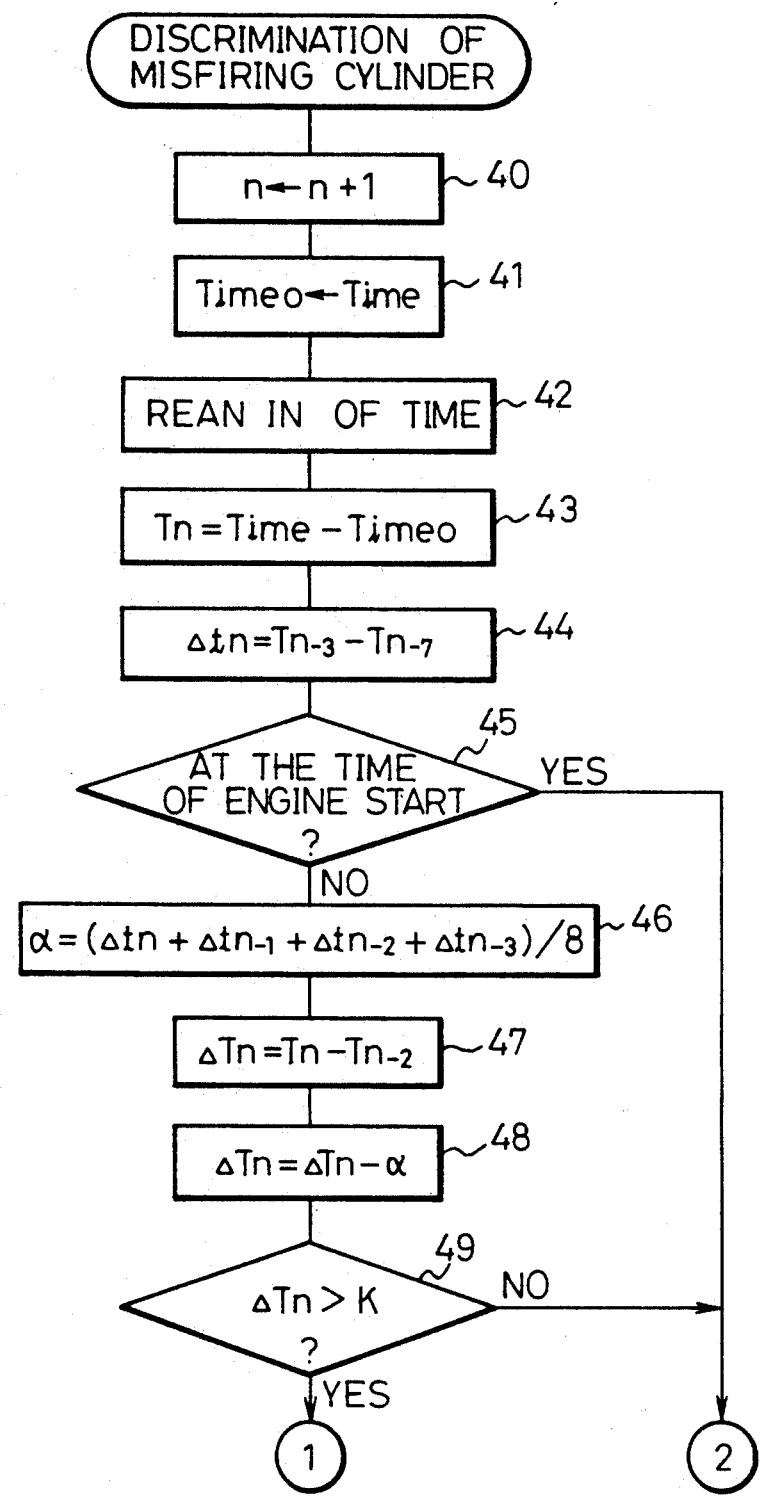
FIGS. 11A, 11B, and 11C are flow charts of a routine for discriminating a misfired cylinder.
Figure 11B:
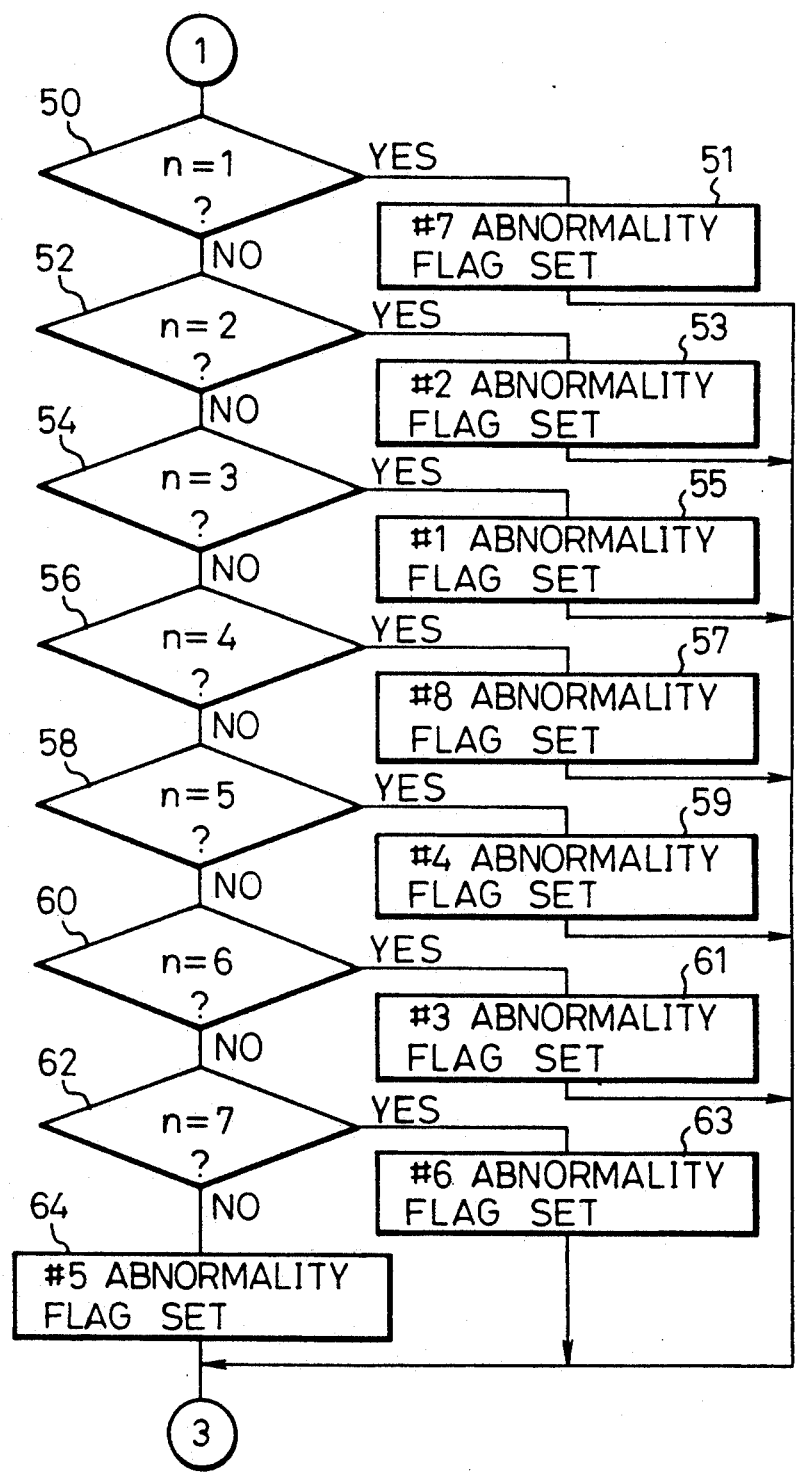
Figure 11C:
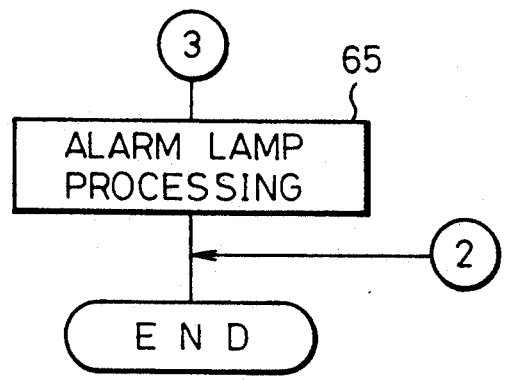

FIGS. 11A, 11B, and 11C show a routine for executing the method of detecting misfiring shown in FIG. 4 and FIG. 5. The routine is executed by interruption every 90° crank angle.

Referring to FIGS. 11A, 11B, and 11C, first, at step 40, the count n is incremented by exactly 1. Next, at step 41, the time Time is made $Time_0$. Next, at step 42, the current time Time counted by the timer 25 is read in. Therefore, $Time_0$ at step 41 comes to express the time at the previous interruption. Next, at step 43, the elapsed time $T_n$ is calculated by subtracting the time $Time_0$ at the previous interruption from the current time Time. Then, at step 44, a difference $\Delta t_n (=T_3-T_7)$ for finding the estimated value $\alpha$ is calculated. Then, at step 45, it is determined if the engine is being started up. When the engine is being started up, the processing routine is ended. As opposed to this, when it is not just being started up, the routine proceeds to step 46. Note that at step 45, it is determined that the engine is being started up when the engine rotational speed N is 400 rpm or less.

At step 46, the estimated value $\alpha$ ($=(\Delta t_n+\Delta t_{n-1}+\Delta t_{n-2}+\Delta t_{n-3})/8$) is calculated. Next, at step 47, the difference $\Delta T_n$ of the elapsed times is calculated by subtracting the elapsed time $T_{n-2}$ calculated two interruptions before from the elapsed time $T_n$ calculated at step 43. Next, at step 48, the final difference $\Delta T_n$ is calculated by subtracting the estimated value $\alpha$ from the difference $\Delta T_n$. Next, at step 49, it is determined if the difference $\Delta T_n$ of the elapsed times is larger than the set value K stored in the ROM 22 as shown in FIG. 10. When $\Delta T_n > K$, the routine proceeds to step 50, while when $\Delta T_n \leq K$, the processing routine is ended.

At step 50, it is determined if the count n is 1. When n=1, the routine proceeds to step 51, where a #7 abnormality flag showing that the no. 7 cylinder #7 has misfired is set, then the routine proceeds to step 65. When n is not equal to 1, the routine proceeds to step 52, where it is determined if the count n is 2. When n=2, the routine proceeds to step 53, where the #2 abnormality flag showing that the no. 2 cylinder #2 has misfired is set, then the routine proceeds to step 65. When n is not equal to 2, the routine proceeds to step 54, where it is determined if the count n is 3. When n=3, the routine proceeds to step 55, where the #1 abnormality flag showing that the no. 1 cylinder #1 has misfired is set, then the routine proceeds to step 65. When n is not equal to 3, the routine proceeds to step 56, where it is determined if the count n is 4. When n=4, the routine proceeds to step 57, where the #8 abnormality flag showing that the no. 8 cylinder #8 has misfired is set, then the routine proceeds to step 65.

On the other hand, when n is not equal to 4, the routine proceeds to step 58, where it is determined if the count n is 5. When n=5, the routine proceeds to step 59, where a no. 4 abnormality flag showing that the no. 4 cylinder #4 has misfired is set, then the routine proceeds to step 65. When n is not equal to 5, the routine proceeds to step 60, where it is determined if the count n is 6. When n=6, the routine proceeds to step 91, where a #3 abnormality flag showing that the no. 3 cylinder #3 has misfired is set, then the routine proceeds to step 65. When n is not equal to 6, the routine proceeds to step 62, where it is determined if the count n is 7. When n=7, the routine proceeds to step 63, where a #6 abnormality flag showing that the no. 6 cylinder #6 has misfired is set, then the routine proceeds to step 65. When is not equal to 7, the routine proceeds to step 64, where a #5 abnormality flag showing that the no. 5 cylinder #5 has misfired is set, then the routine proceeds to step 65. At step 65, the one of the alarm lamps 30, 31, 32, 33 34, 35, 36, and 37 corresponding to the set abnormality flag is lit.

Figure 12A:
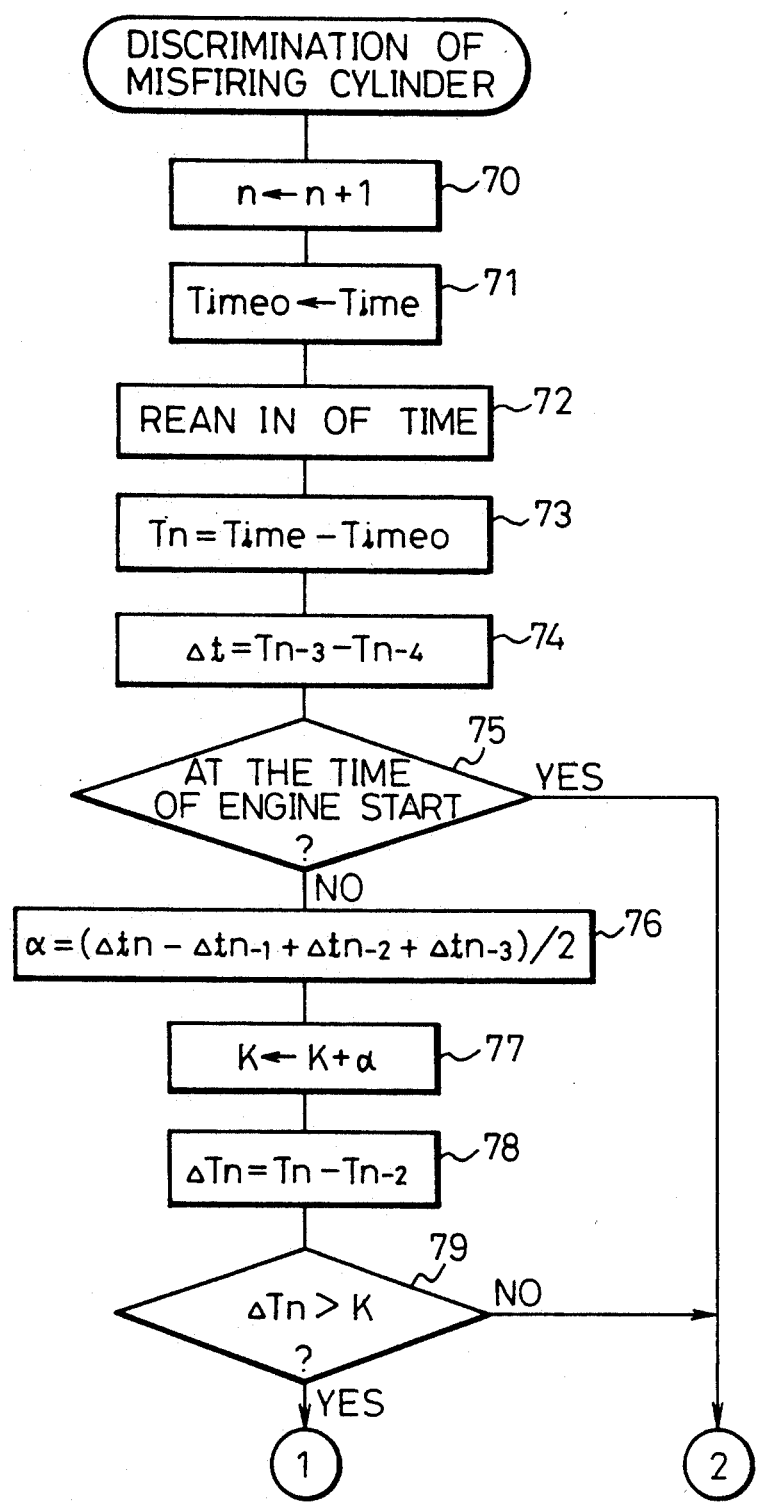
FIGS. 12A, 12B, and 12C are flow charts showing another embodiment for discriminating a misfired cylinder.
Figure 12B:
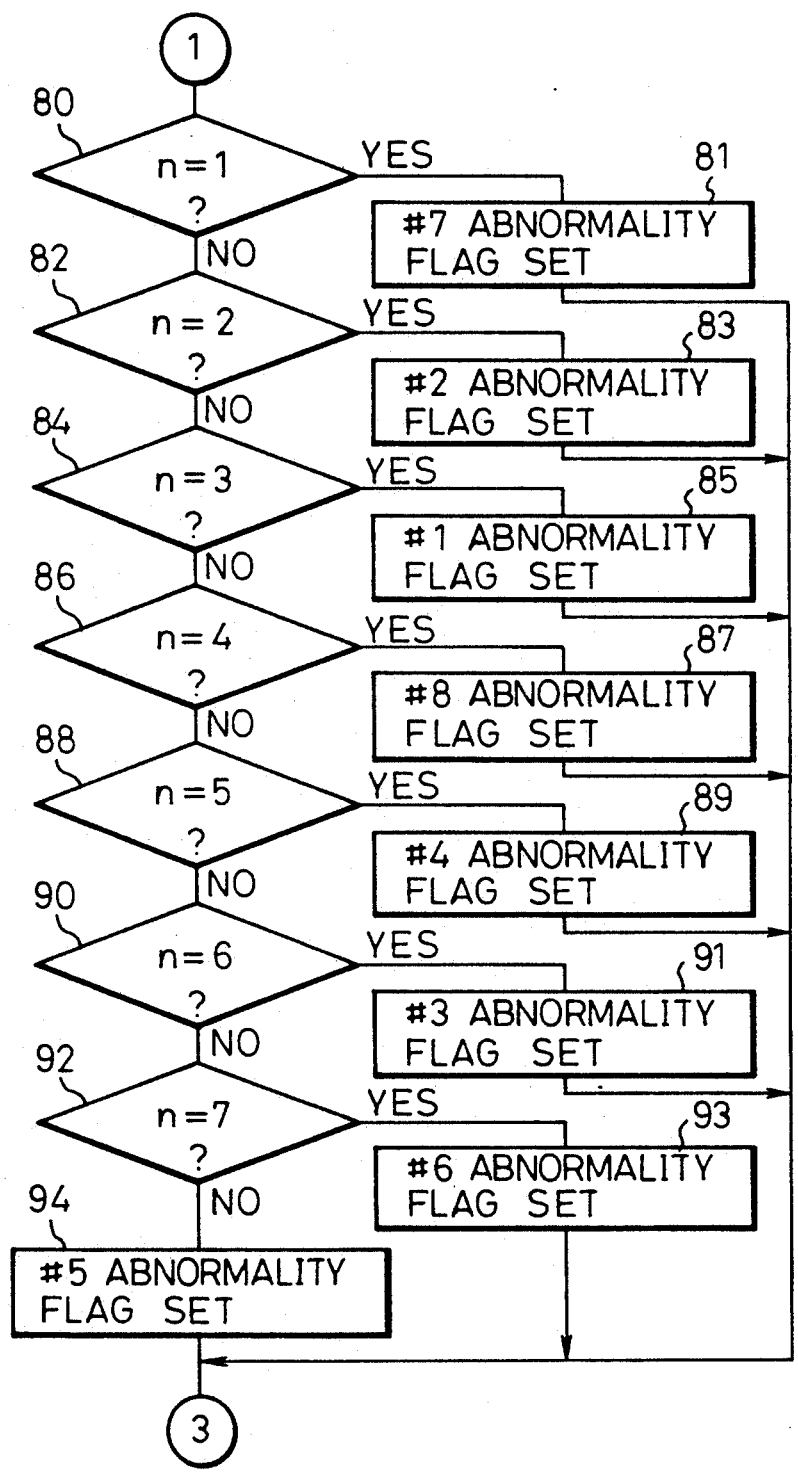
Figure 12C:
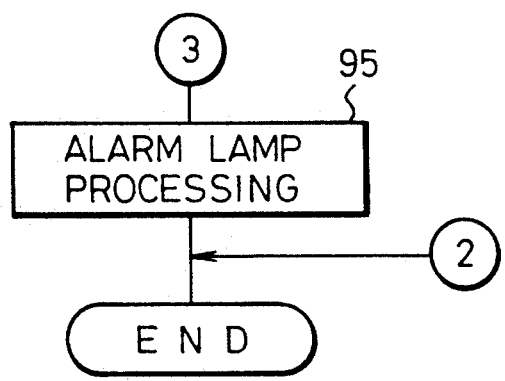

FIGS. 12A, 12B, and 12C show a routine for executing the method of detecting misfiring shown in FIG. 6 and FIG. 7. The routine is executed by interruption every 90° crank angle.

Referring to FIGS. 12A, 12B, and 12C, first, at step 70, the count n is incremented by exactly 1. Next, at step 71, the time Time is made Time$_0$. Next, at step 72, the current time Time counted by the timer 25 is read in. Therefore, Time$_0$ at step 71 comes to express the time at the previous interruption. Next, at step 73, the elapsed time $T_n$ is calculated by subtracting the time Time$_0$ at the previous interruption from the current time Time. Then, at step 74, a difference $\Delta t_n$ ($=T_{n-3}-T_{n-4}$) for finding the estimated value $\alpha$ is calculated. Then, at step 75, it is determined if the engine is being started up. When the engine is being started up, the processing routine is ended. As opposed to this, when it is not just being started up, the routine proceeds to step 76.

At step 76, the estimated value $\alpha$ ($t_n+\Delta t_{n-1}+\Delta t_{n-2}+\Delta t_{n-3}$)/2 is calculated. Next, at step 77, the final set value K is calculated by adding the estimated value $\alpha$ to the set value K stored in the ROM 22 as shown in FIG. 10. Next, at step 78, the difference $\Delta T_n$ of the elapsed time is calculated by subtracting the elapsed time $T_{n-2}$ calculated two interruptions before from the elapsed time $T_n$ calculated at step 73. Next, at step 79, it is determined if the difference $\Delta T_n$ of the elapsed times is larger than the set value K. When $\Delta T_n > K$, the routine proceeds to step 80, while when $\Delta T_n \leq K$, the processing routine is ended.

At step 80, it is determined if the count n is 1. When n=1, the routine proceeds to step 81, where a #7 abnormality flag showing that the no. 7 cylinder #7 has misfired is set, then the routine proceeds to step 95. When n is not equal to 1, the routine proceeds to step 82, where it is determined if the count n is 2. When n=2, the routine proceeds to step 83, where the #2 abnormality flag showing that the no. 2 cylinder #2 has misfired is set, then the routine proceeds to step 95. When n is not equal to 2, the routine proceeds to step 84, where it is determined if the count n is 3. When n=3, the routine proceeds to step 85, where the #1 abnormality flag showing that the no. 1 cylinder #1 has misfired is set, then the routine proceeds to step 95. When n is not equal to 3, the routine proceeds to step 86, where it is determined if the count n is 4. When n=4, the routine proceeds to step 87, where the #8 abnormality flag showing that the no. 8 cylinder #8 has misfired is set, then the routine proceeds to step 95.

On the other hand, when n is not equal to 4, the routine proceeds to step 88, where it is determined if the count n is 5. When n=5, the routine proceeds to step 89, where a no. 4 abnormality flag showing that the no. 4 cylinder #4 has misfired is set, then the routine proceeds to step 95. When n is not equal to 5, the routine proceeds to step 90, where it is determined if the count n is 6. When n=6, the routine proceeds to step 91, where a #3 abnormality flag showing that the no. 3 cylinder #3 has misfired is set, then the routine proceeds to step 95. When n is not equal to 6, the routine proceeds to step 92, where it is determined if the count n is 7. When n=7, the routine proceeds to step 93, where a #6 abnormality flag showing that the no. 6 cylinder #6 has misfired is set, then the routine proceeds to step 95. When is not equal to 7, the routine proceeds to step 94, where a #5 abnormality flag showing that the no. 5 cylinder #5 has misfired is set, then the routine proceeds to step 95. At step 95, the one of the alarm lamps 30, 31, 32, 33 34, 35, 36, and 37 corresponding to the set abnormality flag is lit.

As mentioned above, in an eight-cylinder internal combustion engine, the engine rotational speed N drops the most during a combustion stroke in the cylinder in which combustion occurs two cylinders from the misfiring cylinder. In a four-cylinder internal combustion engine, however, the elapsed time T of the power stroke of the misfiring cylinder becomes longer and therefore the cylinder in the power stroke and the misfiring cylinder coincide when it is determined that misfiring has occurred. Therefore, when the present invention is applied to a four-cylinder internal combustion engine and misfiring is determined from the difference ΔT (=$T_n - T_{n-1}$) of the elapsed times T at two cylinders 180° apart in crank angle, the estimated value α and the difference $\Delta t_n$ for finding the estimated value α are expressed as follows:

That is, the following becomes true for the first embodiment:

$$t_n = T_{n-1} - T_{n-3}$$

$$\alpha = (\Delta t_n + \Delta T_{n-1})/4$$

On the other hand, the following becomes true for the second embodiment:

$$t_n = T_{n-1} - T_{n-2}$$

$$\alpha = (\Delta t_n + \Delta T_{n-1})/2$$

According to the present invention, it is possible to reliably detect the occurrence of misfiring without any effect from deceleration or acceleration.

While the present invention has been described by reference to specific embodiments chosen for the purpose of illustration, it should be apparent that numerous modifications could be made thereto by those skilled in the art without departing from the basic concept and scope of the invention.

We claim:

1. A device for detecting an occurrence of misfiring in a multicylinder engine having a crankshaft, said device comprising:
   angular velocity detecting means for detecting angular velocities of the crankshaft in a time when combustion is carried out in each cylinder;
   difference calculating means for calculating a difference in said angular velocities of the crankshaft between the cylinders;
   comparing means for comparing said difference and a predetermined value;
   estimating means for estimating a change in said difference which is caused by acceleration and deceleration of the engine and occurs when the comparison by said comparing means is carried out;
   correcting means for correcting at least one of said difference and said predetermined value on the basis of said change in said difference before the comparison by said comparing means is carried out; and
   determining means for determining whether or not a misfiring occurs after the correction by said correcting means is carried out to determine that a misfiring occurs when it is determined that said difference exceeds said predetermined value by said comparing means.

2. A device as set forth in claim 1, wherein said correcting means reduces said difference when the change of said difference increases and increases the difference when the change of said difference decreases.

3. A device as set forth in claim 1, wherein said correcting means increases said set value when the change in said difference increases and decreases the said difference when the change in said difference decreases.

4. A device as set forth in claim 1, wherein said set value is a function of the engine load and engine rotational speed.

5. A device as set forth in claim 1, wherein said estimating means estimates said change of said difference from said difference of the angular velocities between cylinders where combustion is performed before the cylinder determined to have misfired by said determining means.

6. A device as set forth in claim 5, wherein said estimating means estimates the change in said difference from said difference of the angular velocities between a cylinder where combustion was performed just before the cylinder determined by said determining means to have misfired and the cylinder where combustion was performed further before that.

7. A device as set forth in claim 5, wherein said angular velocity detecting means is comprised of a rotor, with outer teeth, affixed to the crankshaft and an electromagnetic pickup which is disposed facing the outer teeth of the rotor and wherein said estimating means estimates said change of said difference from the difference in the angular velocities in a pair of cylinders where combustion is performed 360° crank angle apart.

8. A device as set forth in claim 7, wherein said estimating means estimates said change of said difference from an average value of said differences of angular velocities in a plurality of pairs of cylinders where combustion is performed 360° crank angle apart.

9. A device as set forth in claim 5, wherein said estimating means estimates said change of said difference from the difference in the angular velocities between a pair of cylinders where combustion is successively performed.

10. A device as set forth in claim 9, wherein said estimating means estimates said change of said difference from an average value of said differences of said angular velocities in a plurality of pairs of cylinders where combustion is successively performed.

11. A device as set forth in claim 1, wherein said average velocity detecting means detects an elapsed time when a crankshaft rotates a predetermined crank angle and wherein the difference calculated by said difference calculating means is the difference in the elapsed times between cylinders.

12. A device as set forth in claim 11, wherein said multicylinder engine is comprised of an eight-cylinder engine, said predetermined crank angle is 90°, the difference calculated by said difference calculating means is the value obtained by subtracting from the elapsed time $T_n$ of a certain cylinder n (n showing the sequence of combustion) the elapsed time $T_{n-2}$ of the cylinder n-2 where combustion was performed two strokes before, and said determining means determines that misfiring has occurred in the cylinder n-2 when the difference ($T_n - T_{n-2}$) exceeds said set value.

13. A device as set forth in claim 12, wherein said change α of said difference is calculated by the following equations:

$$\alpha = (\Delta t_n + \Delta t_{n-1} + t_{n-2} + t_{n-3})/8$$

$$\Delta t_n = t_n = T_{n-3} - T_{n-7}.$$

14. A device as set forth in claim 12, wherein said change α of said difference is calculated by the following equations:

$$\alpha = (\Delta t_n + \Delta t_{n-1} + t_{n-2} + t_{n-3})/2$$

$$\Delta t_n = t_n = T_{n-3} - T_{n-4}.$$

15. A device as set forth in claim 11, wherein said multicylinder engine is comprised of a four-cylinder engine, said predetermined crank angle is 180°, the difference calculated by said difference calculating means is the value obtained by subtracting from the elapsed time $T_n$ of a certain cylinder n (n showing the sequence of combustion) the elapsed time $T_{n-1}$ of the cylinder n-1 where combustion was performed one stroke before, and said determining means determines that misfiring has occurred in the cylinder n-1 when the difference $(T_n - T_{n-1})$ exceeds said set value.

16. A device as set forth in claim 15, wherein said change $\alpha$ of said difference is calculated by the following equations:

$$\alpha = (\Delta t_n + \Delta t_{n-1})/4$$

$$t_n = T_{n-1} T_{n-3}.$$

17. A device as set forth in claim 15, wherein said change $\alpha$ of said difference is calculated by the following equations:

$$\alpha = (\Delta t_n + \Delta t_{n-1})/2$$

$$t_n = T_{n-1} - T_{n-2}.$$

* * * * *

UNITED STATES PATENT AND TRADEMARK OFFICE
CERTIFICATE OF CORRECTION

PATENT NO. : 5,245,866
DATED : September 21, 1993
INVENTOR(S) : Yukihide HASHIGUCHI, et al.

It is certified that error appears in the above-indentified patent and that said Letters Patent is hereby corrected as shown below:

Column 1, line 27, change "a" to --at--.

Column 2, line 32, change ".cylinder" to --cylinder--.

Column 3, line 65, delete "on".

Column 5, line 17, change "elapse" to --elapsed--.

Column 5, lines 19 and 20, "After this,.." on line 20 should continue as a new sentence on line 19 after "even larger" and not start a new paragraph.

Column 5, line 66, between "known" and "much" insert --how--.

Column 8, line 62, change "$T_3-T_7$" to --$T_{n-3}-T_{n-7}$--.

Column 9, line 49, between "When" and "is" insert --n--.

Column 9, line 53, insert a comma after "33".

Column 10, line 5, change "a ($t_n$.." to --a (=($\Delta$tn--.

Column 10, line 6, change "../2" to --../2)--.

UNITED STATES PATENT AND TRADEMARK OFFICE
CERTIFICATE OF CORRECTION

PATENT NO. : 5,245,866
DATED : September 21, 1993
INVENTOR(S) : Yukihide HASHIGUCHI, et al.

It is certified that error appears in the above-indentified patent and that said Letters Patent is hereby corrected as shown below:

Column 10, line 51, between "When" and "is" insert --n--.

Column 11, line 8, change "$t_n..$" to --$\Delta t_n..$--.

Column 12, line 55, change "$..+t_{n-2}+t_{n-3}$" to --$..+\Delta t_{n-2}+\Delta t_{n-3}..$--.

Column 12, line 63, change "$..+t_{n-2}+t_{n-3}$" to --$..+\Delta t_{n-2}+\Delta t_{n-3}..$--.

Column 14, line 2, change "$t_n$" to --$\Delta t_n$--.

Column 14, line 10, change "$t_n$" to --$\Delta t_n$--.

Signed and Sealed this

Tenth Day of May, 1994

Attest:

BRUCE LEHMAN

Attesting Officer    Commissioner of Patents and Trademarks